(12) United States Patent
Holzwanger et al.

(10) Patent No.: US 9,349,287 B1
(45) Date of Patent: May 24, 2016

(54) SYSTEM FOR OBTAINING VEHICULAR TRAFFIC FLOW DATA FROM A TIRE PRESSURE MONITORING SYSTEM

(71) Applicants: Mark Holzwanger, Forest Hills, NY (US); Xianghong Henry Liu, Ann Arbor, MI (US); Jianfeng Zheng, Lauderadle, MN (US); Heng Hu, Plymouth, MN (US); Jie Sun, St. Paul, MN (US); Harry Holzwanger, Bayside, NY (US); William Reid Block, Broadlands, VA (US)

(72) Inventors: Mark Holzwanger, Forest Hills, NY (US); Xianghong Henry Liu, Ann Arbor, MI (US); Jianfeng Zheng, Lauderadle, MN (US); Heng Hu, Plymouth, MN (US); Jie Sun, St. Paul, MN (US); Harry Holzwanger, Bayside, NY (US); William Reid Block, Broadlands, VA (US)

(73) Assignee: Live Traffic Data LLC, New York, NY (US)

( * ) Notice: Subject to any disclaimer, the term of this patent is extended or adjusted under 35 U.S.C. 154(b) by 0 days.

(21) Appl. No.: 14/855,063

(22) Filed: Sep. 15, 2015

Related U.S. Application Data

(60) Provisional application No. 62/050,966, filed on Sep. 16, 2014.

(51) Int. Cl.
  *G08G 1/01*    (2006.01)
  *H04L 29/06*   (2006.01)
  *G08G 1/015*   (2006.01)
  *B60C 23/04*   (2006.01)

(52) U.S. Cl.
  CPC .............. *G08G 1/0133* (2013.01); *B60C 23/04* (2013.01); *G08G 1/015* (2013.01); *H04L 63/0428* (2013.01)

(58) Field of Classification Search
  CPC .. G08G 1/0133; G08G 1/015; H04L 63/0428; B60C 23/061; B60C 23/0442; B60C 23/04; B60C 23/0416; B60C 23/0408; B60R 25/34
  See application file for complete search history.

(56) References Cited

U.S. PATENT DOCUMENTS

| | | | |
|---|---|---|---|
| 7,912,627 B2 | 3/2011 | Downs et al. | |
| 2011/0156924 A1 | 6/2011 | Nadeem et al. | |
| 2014/0354420 A1* | 12/2014 | Terada | B60C 23/0408 340/442 |
| 2015/0191054 A1* | 7/2015 | Kanenari | B60C 23/04 340/442 |
| 2015/0191056 A1* | 7/2015 | Mori | B60C 23/0416 73/146.5 |
| 2015/0202932 A1* | 7/2015 | Kessler | B60C 23/04 340/445 |
| 2015/0231935 A1* | 8/2015 | Wagner | B60C 23/04 702/141 |
| 2015/0239304 A1* | 8/2015 | Deniau | B60C 23/0442 340/442 |
| 2015/0298513 A1* | 10/2015 | Taki | B60C 23/061 73/146.2 |
| 2015/0321640 A1* | 11/2015 | Hisada | B60R 25/34 340/426.2 |

* cited by examiner

*Primary Examiner* — James Trammell
*Assistant Examiner* — James E Stroud
(74) *Attorney, Agent, or Firm* — Thomas I. Rozsa

(57) ABSTRACT

An embedded Tire Pressure Monitoring sensor is incorporated into vehicular wheels and a secured central server is used to track the unique identification code of each sensor. The TPMS is installed by the vehicular manufacturer in accordance with the federally mandated TREAD Act of 2000. When a vehicle enters the radius of a first encrypted TPM sensor detection transceiver, its TPM sensor identification codes are recorded and time-stamped via an encrypted TPM sensor detection transceiver. If the vehicle enters the area of a second encrypted TPM sensor detection transceiver, the sensor codes will be recorded and time-stamped a second time, encrypted and sent to the secured central server. Using the two encrypted, time-stamped signals, the secured central server calculates traffic flow data.

4 Claims, 11 Drawing Sheets

SYSTEM FOR OBTAINING VEHICULAR TRAFFIC FLOW DATA FROM A TIRE PRESSURE MONITORING SYSTEM

CROSS-REFERENCE TO RELATED APPLICATION

This patent application claims priority to Provisional Application No. 62/050,966 filed on Sep. 16, 2014.

BACKGROUND OF THE INVENTION

1. Field of the Invention

The present invention relates to monitoring surface roadway vehicular traffic flow and traffic conditions.

2. Prior Art

In general, the concept of monitoring surface roadways to compute the traffic flow and traffic conditions has been utilized in the prior art but in a different way from the unique features that will be discussed in the present invention.

The closest prior art that is related to the general field of the invention in which the present invention is to be categorized is as follows.

United States Patent 20110156924 for "ESTIMATION OF TRAVEL TIMES USING BLUETOOTH" issued on Jun. 30, 2011 to Nadeem, Tamer M. et al. The patent discloses methods for estimating travel time using at least two remote systems to record the timestamps associated with obtaining identifying information of a wireless Bluetooth enabled, or other WPAN technology, electronic device in a vehicle. A remote system in one embodiment is a Bluetooth enhanced traffic controller. Characteristics of Bluetooth technology, such as a unique address for each Bluetooth capable device are used to detect a vehicle with a Bluetooth device by at least a first and a second remote system. Vehicle identifying data including at least a time stamp is transmitted by the remote systems to a central system. The central system determines a travel time, or an estimated travel delay. Travel time related data is provided by the central system to a display, such as a variable or dynamic message sign. This method relies on the use Bluetooth technology by tracking Bluetooth enabled devices. Our system does not utilize Bluetooth technology. Our system works with the existing broadcasts of vehicular TPMS sensors which operate on a different radio frequency from Bluetooth technology. Our system, unlike the patent, receives all of its information from TPMS sensors located in the wheels of vehicles and does not have crowdsourcing inaccuracies. These inaccuracies include but are not limited to being unable to distinguish between Bluetooth-enabled devices located in a vehicle from devices located outside of the vehicle (i.e. Bluetooth-enabled devices being used by pedestrians near the roadway).

U.S. Pat. No. 7,912,627 for "Obtaining road traffic condition data from mobile data sources" issued on Mar. 22, 2011 to Downs et al. The patent discloses techniques for assessing road traffic conditions in various ways based on obtained traffic-related data, such as data samples from vehicles and other mobile data sources traveling on the roads, as well as in some situations data from one or more other sources (such as physical sensors near to or embedded in the roads). The assessment of road traffic conditions based on obtained data samples may include various filtering and/or conditioning of the data samples, and various inferences and probabilistic determinations of traffic-related characteristics of interest from the data samples. In some situations, at least some of the mobile data sources are configured to frequently acquire and store data samples, and to occasionally make multiple such data samples available together for use in the road traffic condition assessment (e.g., by acquiring a data sample every minute and by transmitting a group of stored data samples every 15 minutes). This technique utilizes the global positioning system as well as cell phones to monitor and track moving vehicles. Our system uses neither, nor tracks specific cars. Our system does not utilize mobile data sources, which is unable to distinguish between mobile devices located in a vehicle from devices located outside of the vehicle (i.e. mobile devices being used by pedestrians near the roadway). All data gathered is anonymous and received based on the vehicle entering our transceiver's detection area.

There is a significant need for an improvement in the above-described prior art because the above-described prior art does not provide 100% vehicular source of traffic data flow and conditions and there is a significant need for an innovation which does provide 100% vehicular source of traffic data flow and conditions.

SUMMARY OF INVENTION

In accordance to the Federal Transportation Recall Enhancement, Accountability, and Documentation (TREAD) Act of 2000, all newly manufactured vehicles are required to be equipped with a Tire Pressure Monitoring System (TPMS), which includes a Tire Pressure Monitoring (TPM) Electric Control Unit (ECU), four or more TPM sensors and a dashboard display unit. The TPMS monitors tire inflation pressure and temperature continuously in order to inform and/or warn the driver about the condition of the tires. The system was mandated to increase safety and decrease the amount of accidents directly and indirectly related to under/over inflated tires, reduce fuel consumption and decrease tire wear.

The present invention is a surface transportation vehicular wheel based monitoring system, which consists of an encrypted central server and a group of encrypted TPM sensor detection transceivers that receive the vehicular TPM sensors within the vehicle wheels, to estimate traffic flow data including, travel times, vehicular origin-destination, tire pressure and tire temperature from vehicles equipped with a Tire Pressure Monitoring System (TPMS). TPM sensors installed in vehicle wheels periodically broadcast pressure and temperature information together with a unique Identification Code in the form of radio frequency (RF) to the TPM ECU located inside the vehicle while the vehicle is operating. The invention's TPM sensor detection transceivers are situated at roadside locations where surface vehicles travel. The encrypted transceivers capture the RF signal transmitted by one or several TPM sensors when a vehicle equipped with TPMS enters the detection area of the encrypted transceiver with the sensors transmitting signals. The encrypted transceivers will then decode the received signal, obtain the unique Identification Code associated with a specific TPM sensor, time-stamp the code, and transmit the data to the secured central server in an encrypted data message. When the same identification code is detected at two different transceiver locations, then the central server which is a computer converts this information to provide an estimate of travel time, delay and origination-destination information of a specific vehicle. By integrating the information from all the encrypted TPM sensor detection transceivers in a network, the invented system is able to provide more complete and accurate traffic information than current technologies can offer. The invention, unlike all other existing live traffic data technology, is able to distinguish between mobile data sources outside a vehicle (i.e. cyclists, pedestrian traffic) versus on or inside a vehicle and accurately calculates surface vehicle traffic flow. The invention will only measure vehicular tires for accurate live traffic flow which is where the invention becomes a significant improvement to provide valuable information to the motoring public. The prior art discovered relies on crowd sourcing which is a new phenomena now omnipresent in large surface traffic data companies (i.e. INRIX, Google Maps, etc.) which does not lend to accurate traffic flow data readings being sent to the motoring public.

The system of tracking vehicles is anonymous, linking the unique identification code in the RF signal transmitted by a wheel's TPM sensor to the vehicle. The present invention TPM sensor transceivers will be situated at roadside locations where vehicles travel. The communication system and data exchange between the TPM sensor detection transceivers and the central server is encrypted. TPM Sensor Detection to Improve Crowd Sourcing Accuracy in Systems that estimate travel time utilizing Bluetooth and Mobile data source by eliminating Non-vehicular data sources. Smartphone crowd sourcing is currently the most widely used method of providing real-time traffic flow data. Cellular devices which allow their location to be tracked send small data packages to a central server, where the data are processed and heavily aggregated to attain an estimated traffic flow map. This method has been proven, in a recent study by the University of Michigan October 2013 study of GPS live traffic data companies, to be highly inaccurate as Smartphones, regardless of whether they are actually traveling with the owner in a vehicle or just with walking pedestrians, will send out data to the central server which has no ability to differentiate. By combining data provided by the current method of tracking Smartphones with the data gained through the TPM sensor detection transceiver network, a central server can match the identification code of a Smartphone to a group of unique TPM sensor codes of a vehicle. In this way, when the Smartphones are processed for crowd sourcing, only phones in close proximity to their set match of TPM sensor codes will be registered for the traffic flow map. Smartphones not meeting this requirement will be filtered out. Therefore, the system will be able to distinguish mobile phones with drivers in vehicles from mobile phones with pedestrians using the data accumulated from TPM sensor detection transceiver network. Over multiple TPM sensor detection transceiver locations, the central server can identify a specific Smartphone's identification number and/or Bluetooth identification code repeatedly registered at transceivers in proximity with a combination of the same unique identification code(s) of a vehicular TPMS sensor(s). The server then identifies that the group of TPM sensor identification codes belong to the TPMS of the same vehicle and creates a virtual vehicle with the group (e.g four) of unique identification codes in the server. When any of the codes is detected at a TPM transceiver location, the system can identify the vehicle, which will greatly increase the sampling rate.

BRIEF DESCRIPTION OF THE DRAWINGS

Referring particularly to the drawings for the purposes of illustration only and not limitation, there is illustrated.

DETAILED DESCRIPTION OF THE INVENTION

Although specific embodiments of the present invention will now be described with reference to drawings, it should be understood that such embodiments are by way of example only and merely illustrative of but a small number of the many possible specific embodiments what can represent applications of principles of the current invention. Various changes and modifications obvious to one skilled in the art to which the present invention pertains are deemed to be within the spirit, scope and contemplation of the present invention.

The present invention is a method or system to accurately estimate traffic flow data comprised of, but not limited to, travel times and vehicular origin-destination from vehicles equipped with a Tire Pressure Monitoring System (TPMS). Vehicles are required to be equipped with TPMS by their original manufacturers in accordance to the Federal TREAD Act of 2000. The TPM sensors of a four-wheel vehicle include four sensors each with a unique identification code, installed into the wheels. Under normal circumstances, the TPM sensors will broadcast data to the TPM ECU informing it of the current pressure and temperature in any of the tires. The invention includes a secured central server and a group of encrypted TPM sensor detection transceivers installed at roadside locations. It employs an encrypted communication system which will allow the roadside encrypted TPM sensor detection transceivers to transmit its data to the secured central server. The location fixed encrypted TPM sensor detection transceivers capture and decode anonymous RF signal data from vehicular TPM sensors to provide aggregated information on highly accurate spatial-temporal traffic data.

Figure 1B:
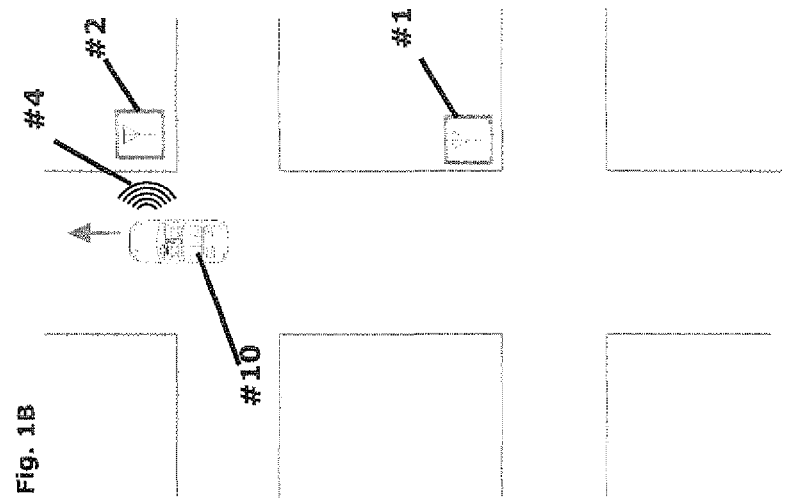
FIG. 1B is a schematic diagram showing continuation of FIG. 1A depicting the same vehicle entering the detection area of a second TPM sensor detection transceiver.
Figure 1A:
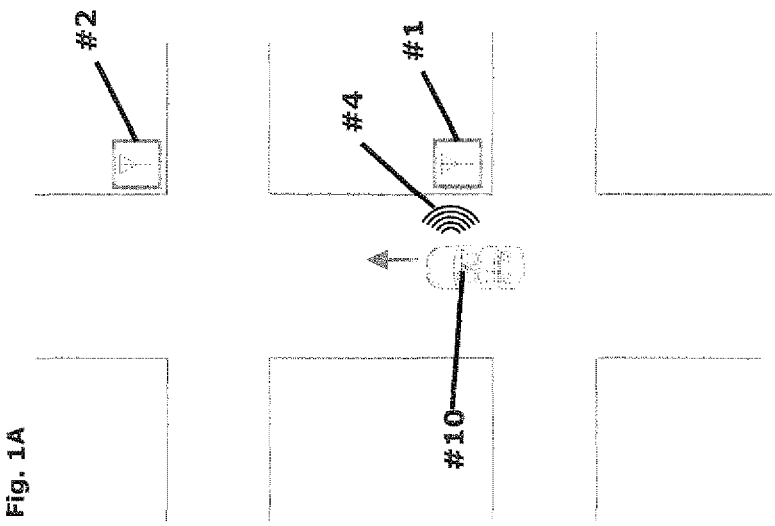
FIG. 1A is a schematic diagram depicting the entrance of a vehicle into the detection area of a set of our roadside TPM sensor detection transceivers which capture and time-stamp the unique identification codes of the TPM sensors via radio frequency signals.

Referring to FIG. 1A, upon entering the detection area of an encrypted TPM sensor detection transceiver (#1), the broadcasted radio signal (#4) from the TPM sensor in the wheels of a vehicle (#10) are recorded, time-stamped, encrypted and sent to the secured central server by the encrypted TPM sensor detection transceiver (#1). This establishes the first instance of communication to the invention's encrypted TPM sensor detection transceiver (#1).

Referring to FIG. 1B, when said vehicle (#10) enters the detection area of the second encrypted TPM sensor detection transceiver (#2), the process is repeated, establishing the second instance of encrypted communication. The secured central server then determine the travel time, origination and destination, direction and route of the vehicle (#10) using a minimum of two time-stamped signals and location of the encrypted TPM sensor detection transceivers (#1 and #2), as seen in FIG. 3.

Figure 2:
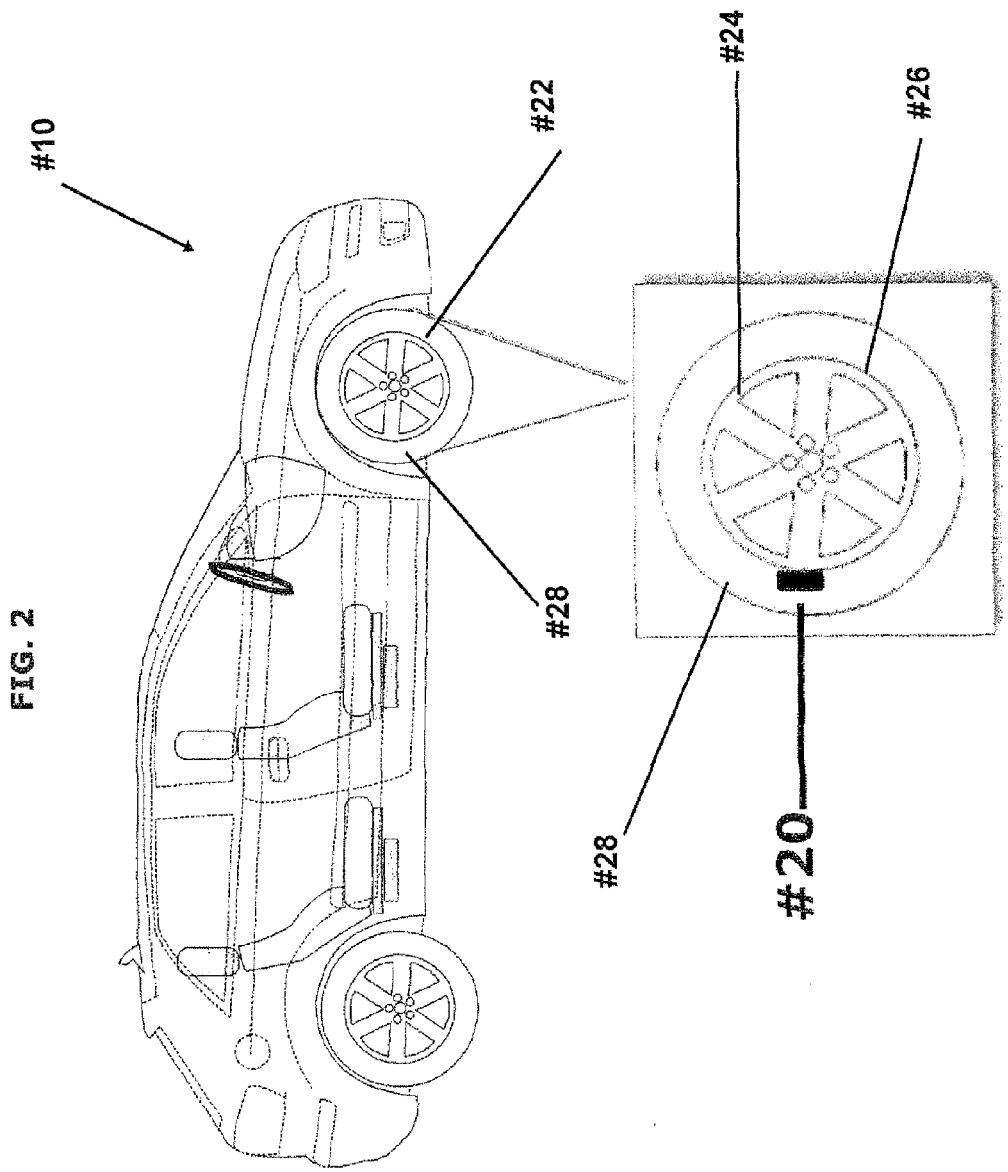
FIG. 2 is a schematic diagram showing the location of the TPM sensors relative to the rest of the vehicle.

Referring to FIG. 2, there is illustrated a vehicle (#10) with magnification of its front right wheel (#22) and tire (#28) showing the location of the embedded TPM sensor (#20) which is located between the interior boundary (#26) of tire (#28) and the wheel rim (#24). The TPM sensor (#20) is at the same location of all tires attached to the vehicle (#10).

Figure 3:
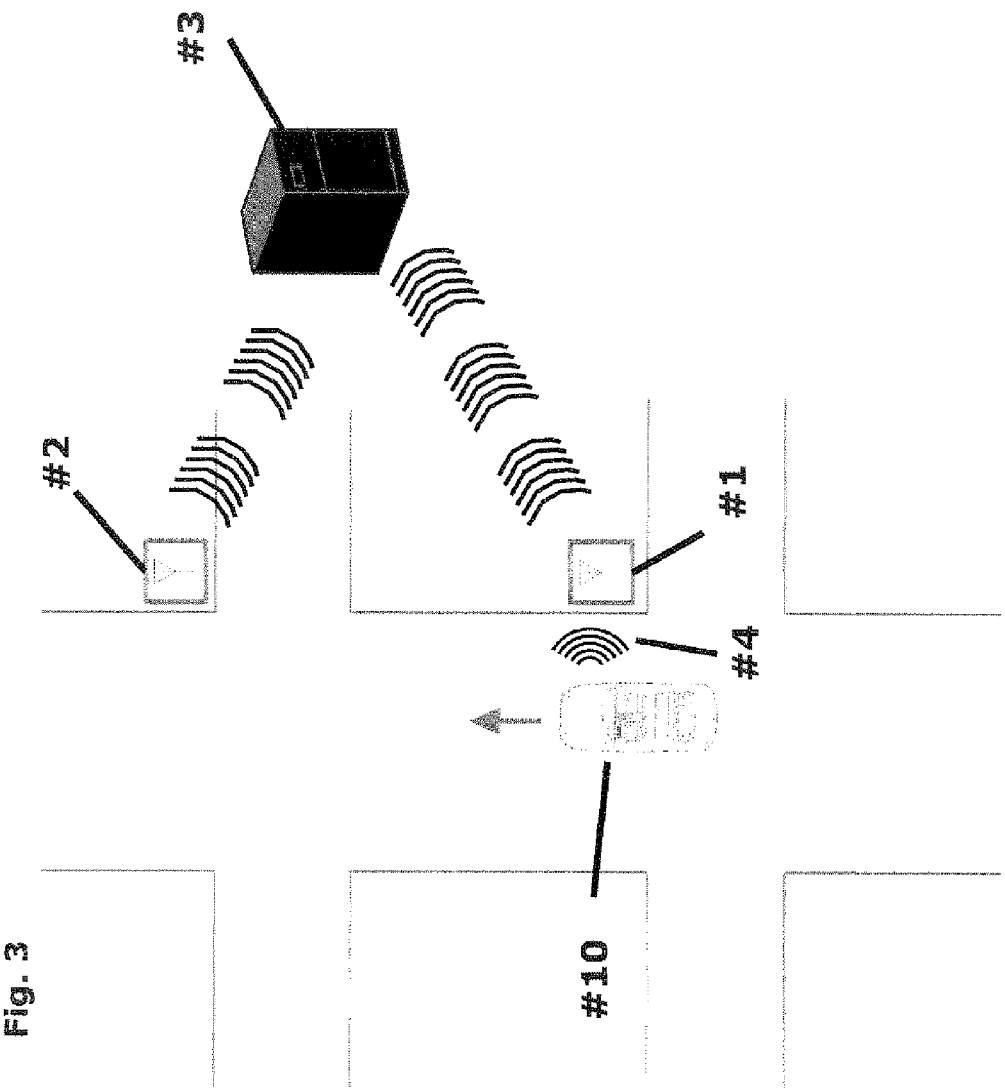
FIG. 3 is a schematic diagram showing the flow of data from the TPM sensor to the TPM sensor detection transceiver which is then encrypted and sent to the central server.

Referring to FIG. 3 vehicle (#10) drives past encrypted TPM sensor detection transceiver (#1), the broadcasted TPM sensor radio signal (#4) is received by the invention's transceivers (#1). The received TPM sensor data is then transmitted wirelessly or by similar current or future communication protocol to the secured central server (#3). The process continues to the next TPM sensor detection transceiver (#2) and continues to provide the end user with valuable accurate traffic flow data.

Figure 4:
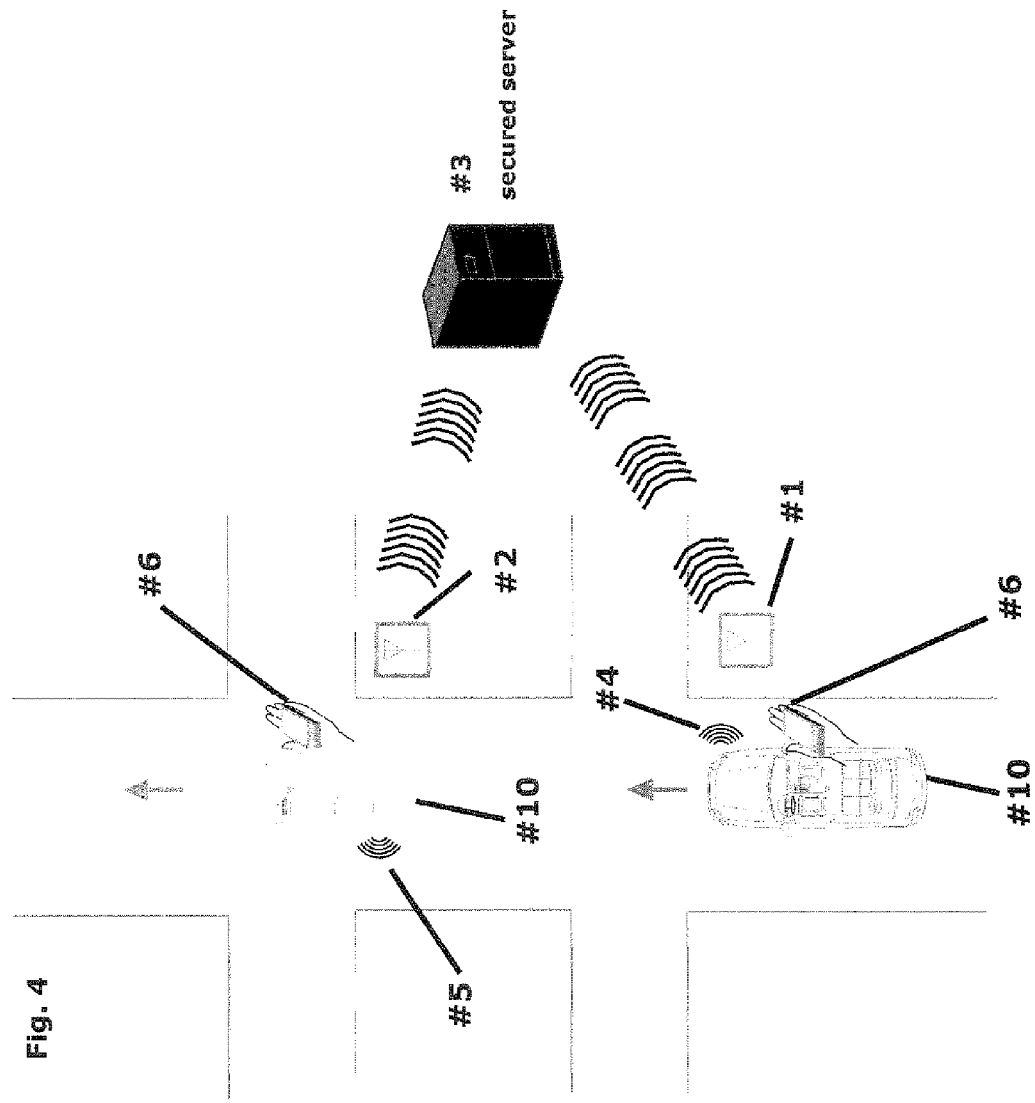
FIG. 4 is a schematic diagram showing the integration of data from both TPM sensors and the cell phone in the car.

Referring to FIG. 4 vehicle (#10) with a mobile/Bluetooth device (#6) proceeds past the invention's encrypted TPM sensor detection transceiver (#1). The broadcasted TPM sensor radio signal (#4) from one of the TPM sensors is detected by the transceiver (#1). The received data is then time stamped and transmitted wirelessly or by similar current or future communication protocol to the secured central server (#3). When the vehicle (#10) travels past the next encrypted TPM sensor detection transceiver (#2), another broadcasted TPM sensor radio signal (#5) from another TPM sensor is detected, time stamped and transmitted to the secured central server (#3) by the transceiver (#2). Over multiple TPM sensor detection transceiver locations, the central server can link a specific mobile device's identification number to a group of TPM sensor(s). When the mobile/Bluetooth devices are processed for crowd-sourcing, only the ones in close time/location proximity to their set match of TPM sensor codes will be utilized.

Figure 5:
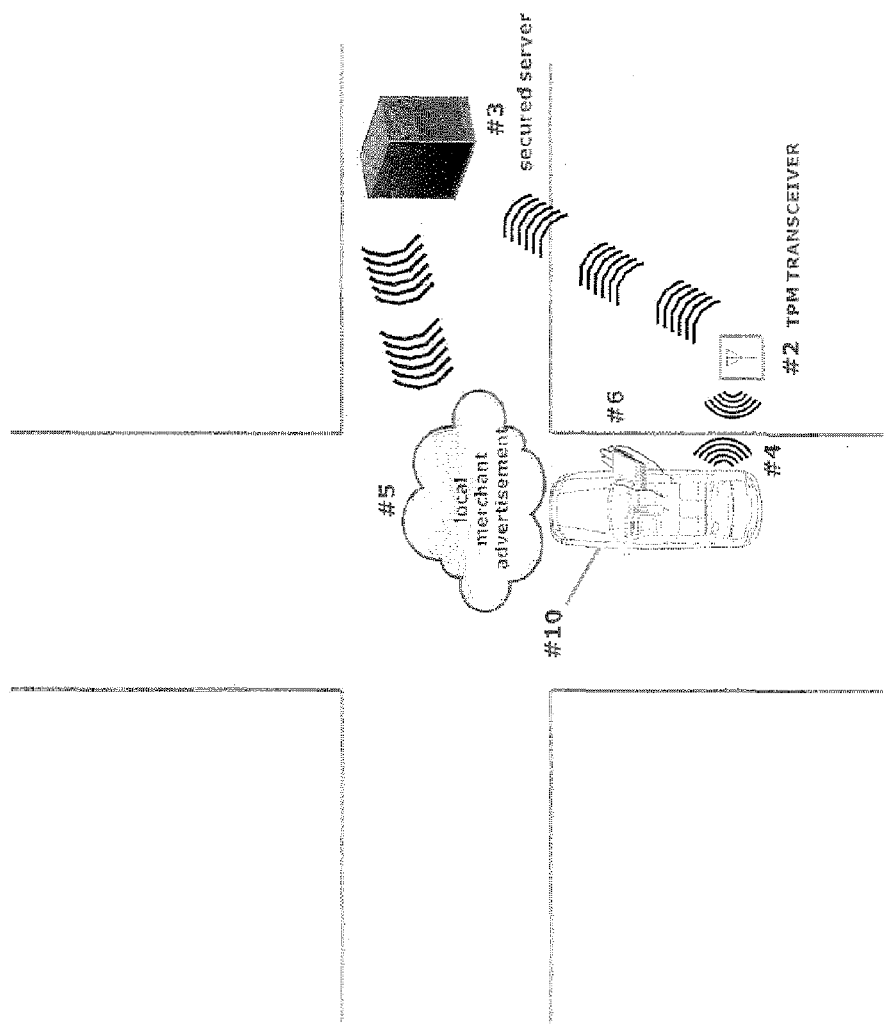
FIG. 5 is a schematic diagram showing roadside TPM sensor detection transceivers to provide merchant information in localized communities.

Referring to FIG. 5 vehicle (#10) with its broadcasted TPM sensor signal (#4) proceeds past the invention's encrypted TPM sensor detection transceiver (#2). At this juncture a detected signal is transmitted from the encrypted TPM sensor detection transceiver (#2) to the secured server (#3). The secured server (#3) then provides information of the local merchant's advertisement (#5) to be displayed on a mobile/Bluetooth device (#6) within the vehicle (#10).

Figure 6:
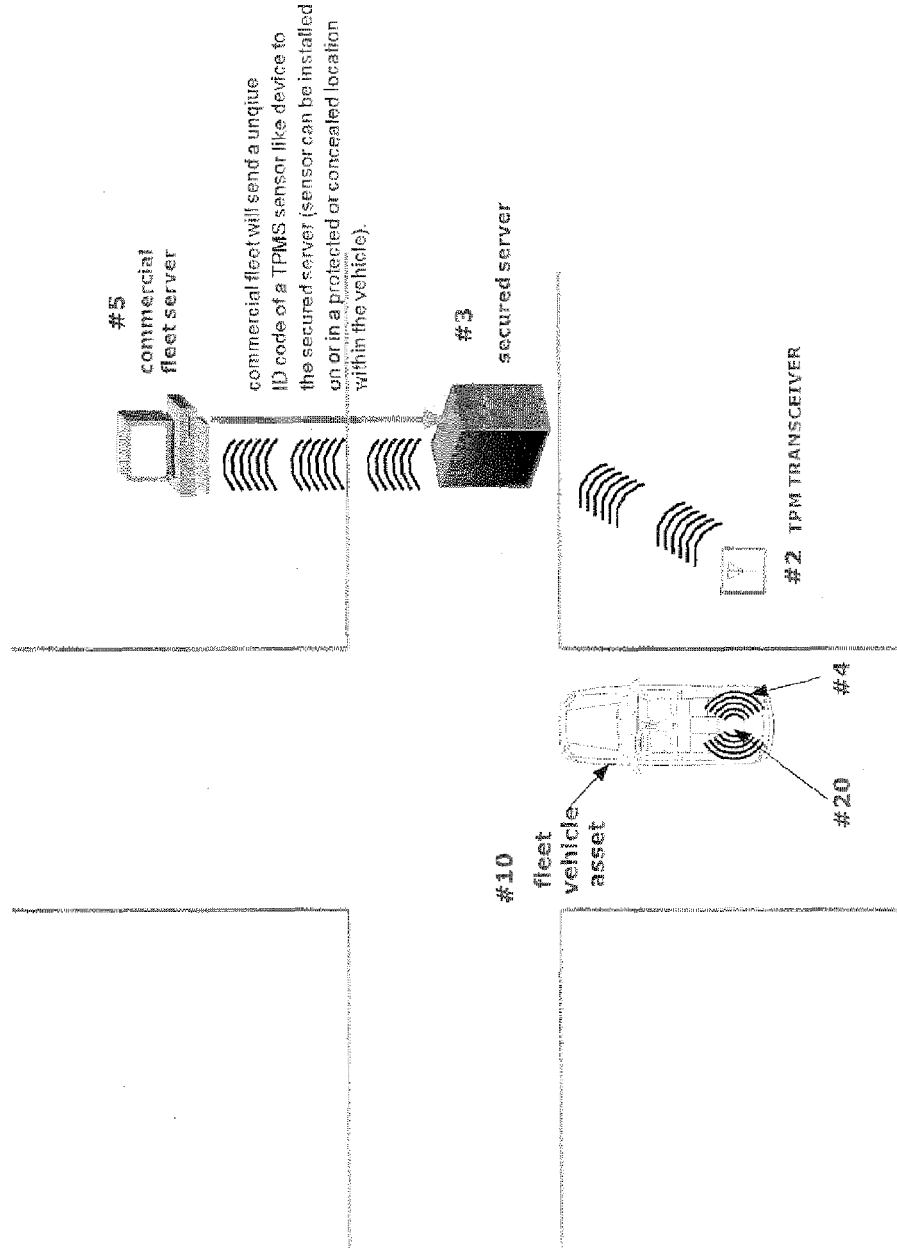
FIG. 6 is a schematic diagram showing TPM sensor like device is used to protect assets.

Referring to FIG. 6 vehicle (#10) with its TPM sensor like device (#20) proceeds past the invention's encrypted TPM sensor detection transceiver (#2). At this juncture a detected signal (#4) is transmitted from the encrypted TPM sensor detection transceiver (#2) to the secured server (#3). The unique identification code from the TPM sensor like device (#20) is then sent to the commercial fleet's server (#5), wherein the fleet manger is able to accurately track its asset via ID of the device (#20).

Figure 7:
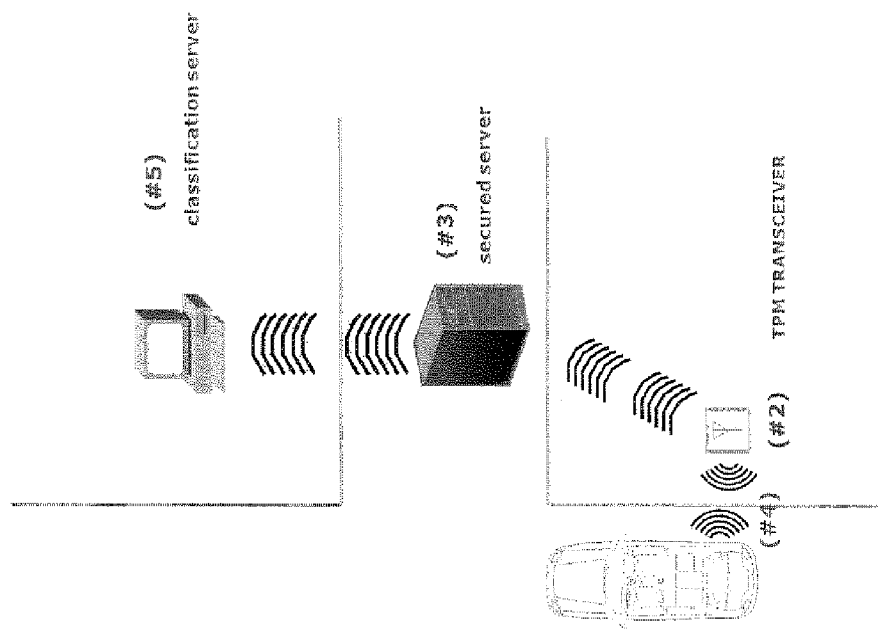
FIG. 7 is a schematic diagram showing TPM sensor data for classification of vehicles.

Referring to FIG. 7 vehicle (#10) with its broadcasted TPM sensor signal (#4) proceeds past the invention's encrypted TPM sensor detection transceiver (#2). At this juncture a signal is transmitted from the encrypted TPM sensor detection transceiver (#2) to the secured server (#3). The unique identification code contained in the TPM sensor signal (#4) is then sent to the server (#5) with proper classification of said vehicle for purposes of i.e. DMV's, law enforcement agencies, and the like.

Figure 8:
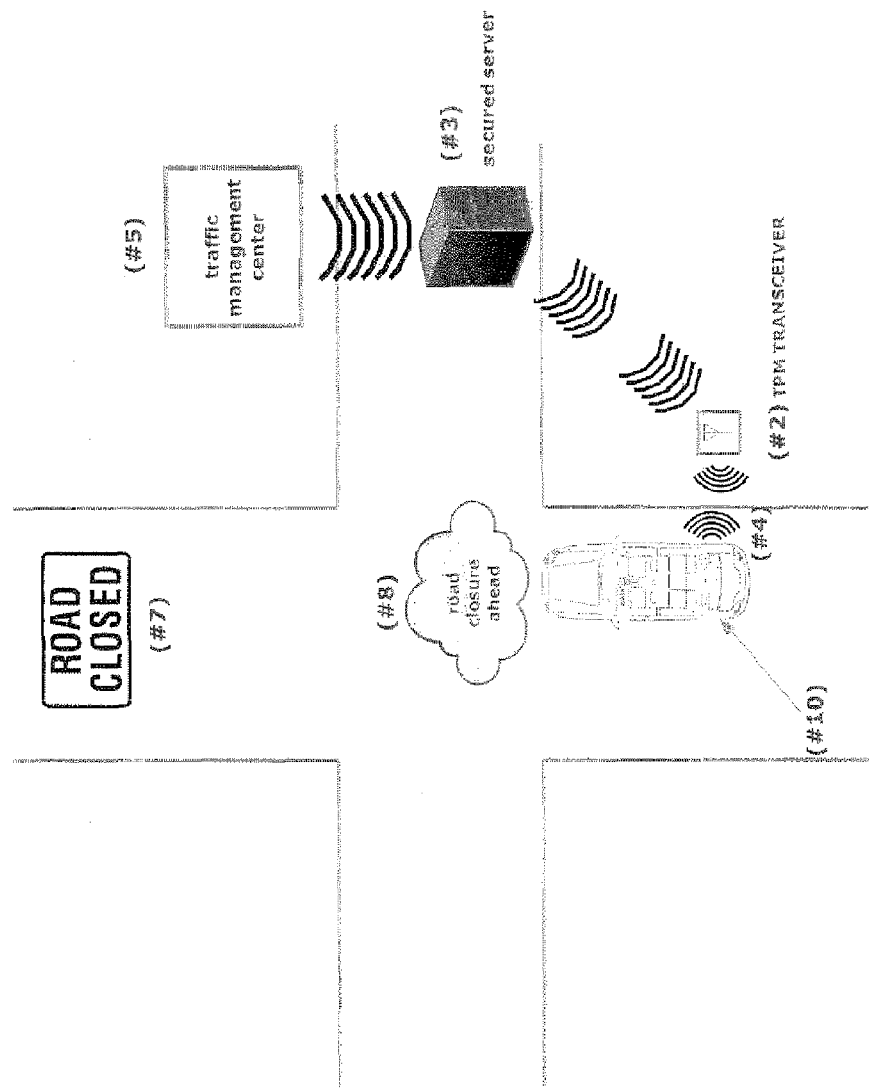
FIG. 8 is a schematic diagram showing TPM sensor detection for traffic sign assistance.

Referring to FIG. 8 vehicle (#10) with its broadcasted TPM sensor signal (#4) proceeds past the invention's encrypted TPM sensor detection transceiver (#2). At this juncture a message (i.e. road closure ahead #8) is transmitted from the secured server to the vehicle via communication protocol from the traffic management center or fleet serve (#5) of roadway assistance road closed (#7).

Figure 9:
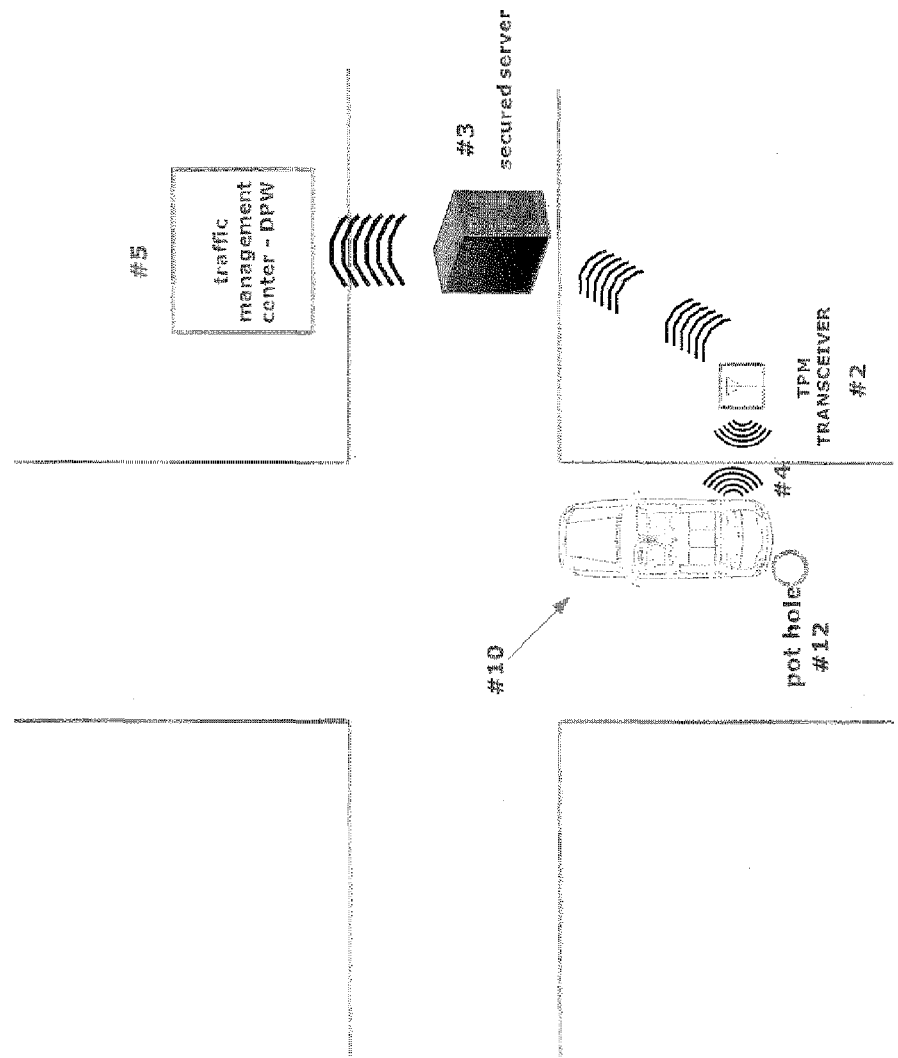
FIG. 9 is a schematic diagram showing road condition analysis with the use of TPM sensors.

Referring to FIG. 9 vehicle (#10) with its broadcasted TPM sensor signal (#4) proceeds past the invention's encrypted TPM sensor detection transceiver (#2). During this time the vehicle (#10) drives, for example, over a pot hole (#12) in the roadway which may cause a change in tire pressure. The change in the tire pressure is recorded and transmitted to the secured server (#3). The data is then sent to the traffic management center—DPW to alert of a road condition analysis.

Figure 10:
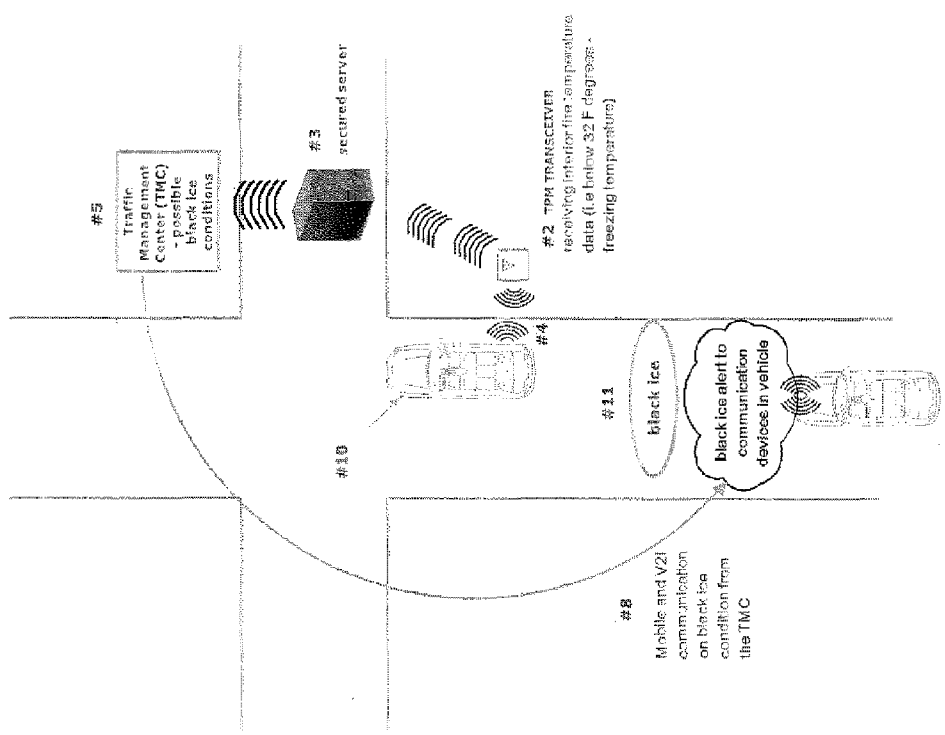
FIG. 10 is a schematic diagram showing road conditions due to weather warning with the use of TPM sensors.

Referring to FIG. 10 vehicle (#10) with its broadcasted TPM sensor signal (#4) proceeds past the invention's encrypted TPM sensor detection transceiver (#2). At this juncture a signal is transmitted from the encrypted TPM sensor detection transceiver (#2) to the secured server (#3) providing the secured server (3) with tire pressure and temperature of said tire's interior. If the temperature within said tire indicates freezing temperatures or below freezing temperatures (32 F degrees) along with known existing moisture detected from the weather stations, then the probability of black ice (#11) on the roadways is apparent. The traffic management center (#5) will then provide warnings on the roadways of black ice or similar temperature related conditions via mobile or other communication method (#8).

Figure 11:
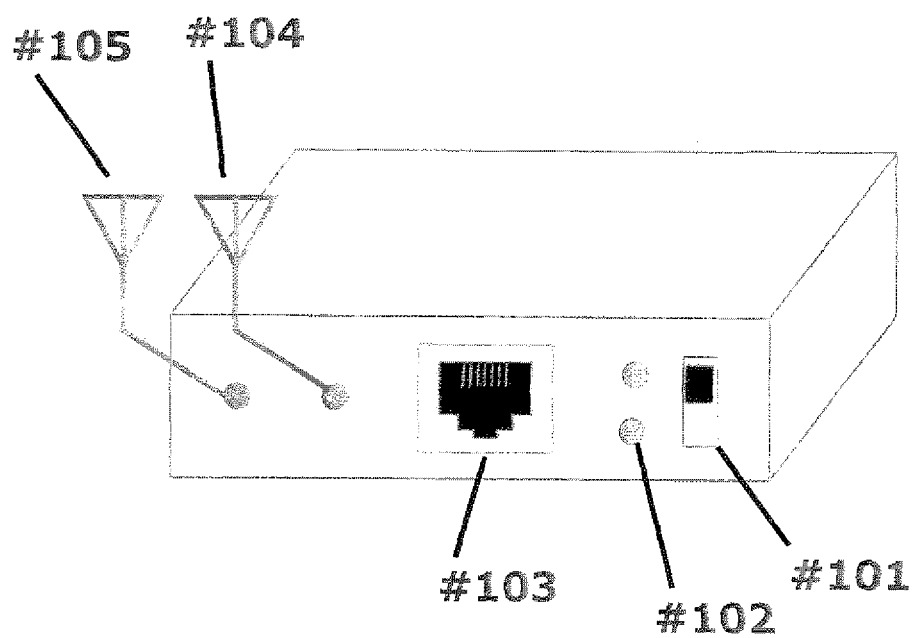
FIG. 11 is a schematic diagram showing the front panel of the invention's TPM sensor detection transceiver.

Referring to FIG. 11 the TPM sensor detection transceiver consists of a power switch (#101), status indicators (#102), an Ethernet port (#103) that sends encrypted data packages to the central server through Ethernet network, a TPM sensor radio communication antenna (#104) that detects the broadcast radio signals from TPM sensors and sends trigger signal to actuate TPM sensors if necessary, and a cellular/wireless communication antenna (#105) that sends encrypted data packages to the central server through cellular/wireless network.

Defined in detail, the present invention is a system to estimate traffic flow data used in conjunction with a vehicle having at least four (4) wheels on which the vehicle travels, a tire pressure monitoring system (TPMS) which includes a Tire Pressure Monitor (TPM) electric control unit (ECU) inside the vehicle, a separate tire pressure monitor (TPM) sensor respectively installed in at least four wheels of the vehicle, a visual tire pressure information member positioned to provide TPM information from the TMP ECU received from each TPM sensor to a driver while the vehicle is being driven, each TPM sensor having a unique identification code to periodically broadcast data of the current pressure and temperature in each respective tire and further broadcast a radio frequency (RF) signal from each respective TPM sensor in each respective one of the wheels of the vehicle to the TPM ECO ("TPM installed vehicle"), the system to estimate traffic flow data comprising: (a). positioning a first encrypted TPM detection transceiver having a first given detection range at a first location where said TPM installed vehicle passes within the second given detection range, the first encrypted transceiver pre-programmed to capture and decode RF signals broadcast by said TPM installed vehicle's TMP sensors and obtaining each unique identification code associated with each specific TPM sensor and time stamping each unique identification code (collectively first TPM sensor data) and transmitting the first TMP sensor data to said secure central server in a first encrypted data message; (b) positioning a second encrypted TPM detection transceiver having a second given detection range at a second location where said TPM installed vehicle passes within the second given detection range, the second encrypted transceiver pre-programmed to capture and decode RF signals broadcast by said TPM installed vehicle's TMP sensors and obtaining each unique identification code associated with each specific TPM sensor and time stamping each unique identification code (collectively second TPM sensor data) and transmitting the second TMP sensor data to said secure central server in a second encrypted data message; and (c) when the same identification is transmitted in the first encrypted data message and the second encrypted data message, the central server converts the encrypted data messages to an estimate of travel time, delay and origination-destination information of said TMP installed vehicle.

Defined more broadly, the present invention is a system to estimate traffic flow data used in conjunction with a vehicle having at least four (4) wheels on which the vehicle travels, a tire pressure monitoring system (TPMS) which includes a Tire Pressure Monitor (TPM) electric control unit (ECU) inside the vehicle, a separate tire pressure monitor (TPM) sensor respectively installed in at least four wheels of the vehicle, a visual tire pressure information member positioned to provide TPM information from the TMP ECU received from each TPM sensor to a driver while the vehicle is being driven, each TPM sensor having a unique identification code to periodically broadcast data of the current pressure and temperature in each respective tire and further broadcast a radio frequency (RF) signal from each respective TPM sensor in each respective one of the wheels of the vehicle to the TPM ECO ("TPM installed vehicle"), the system to estimate traffic flow data comprising: (a) positioning a multiplicity of encrypted TPM detection transceivers each having a given detection range at a multiplicity of locations where said TPM installed vehicle passes within said given detection range, each respective encrypted transceiver pre-programmed to capture and decode RF signals broadcast by said TPM installed vehicle's TMP sensors and obtaining each unique identification code associated with each specific TPM sensor and time stamping each unique identification code (respective TPM sensor data) and transmitting said respective TMP sensor data to said secure central server in a respective encrypted data message for each respective one of the multiplicity of TMP transceivers; and (b) when the same identification is transmitted in each of said respective encrypted data message, the central server integrates all of the respective encrypted data messages to an estimate of travel time, delay and origination-destination of said TMP installed vehicle.

EMBODIMENTS OF THE INVENTION

Although specific embodiments of the present invention will now be described with reference to the drawings, it should be understood that such embodiments are by way of example only and merely illustrative of a small number of the many possible specific embodiments which can represent applications of the principles of the present invention. Various changes and modifications obvious to one skilled in the art to which the present invention pertains are deemed to be within the spirit, scope and contemplation of the present invention.

The invention can be utilized by Departments of Transportation by aggregating the data of multiple vehicles calculated by the invention's secured central server to produce highly accurate spatial-temporal traffic information mapping without installation of expensive and cumbersome infrastructure such as inductive loop detectors, radar, camera or infrared sensors and other labor intensive roadway concepts. The departments can then use the map to monitor traffic flow conditions and/or decide on the best course of action to alleviate traffic congestion along with better roadway infrastructure.

During times deemed fit by the surface transportation departments and if permissible by federal, state, or local regulatory agencies (i.e. the Federal Highway Administration (FHWA) and National Highway Traffic Safety Administration (NHTSA), the encrypted TPM sensor detection transceivers can also be operated in an active mode. In the active mode, the transceiver sends out activation signals via RF in a designed interval. TPM sensors inside tires of vehicles passing by will respond the activation signal and reply back with the current pressure and temperature information together with the unique Identification Codes. The encrypted TPM sensor detection transceivers will then decode the signal, obtain the unique Identification Codes, time-stamp the codes, and transmit to the secured central server in an encrypted message. Under the active mode, the probability for encrypted TPM sensor detection transceivers to detect TPM sensors will be highly increased, the sampling rate and estimation accuracy of the system will be improved as well.

Vehicles are detected solely through the unique identification codes transmitted by the vehicle's TPM sensors. Because a vehicular TPMS utilizes individual sensors which broadcast radio frequency data independent of each other, the probability of detecting a passing vehicle at the moment of transmission is greatly increased. The time-stamped data from the TPM sensor via the encrypted TMS detection transceivers is sent to a data cloud maintained by the secured central server, where it is then decrypted and organized/managed, allowing the secured central server to group the TPM sensor identification codes and create a virtual vehicle with the TPM sensor identification codes collected which correspond to a real, tangible vehicle. The unique identification code of a TPM sensor in a vehicle is only recorded upon entering the detection area of a set roadside encrypted TPM sensor detection transceiver and is not tracked thereafter which provides a privacy security fire wall. TPM sensors of a vehicle are constantly being broadcasted with traffic flow data and will continue to be received by the encrypted TPM sensor detection transceiver so long as the vehicle remains in the area of transmission. The secured central server and the encrypted TPM sensor detection transceivers are capable of reading, decoding and analyzing transmission frequencies of varying range. The system is designed to aggregate vehicular location and direction to form a highly accurate map of live traffic.

The secured central server can allow users to access the processed live traffic map concerning vehicle location and speed to assist in determining the best route for the lowest commute time.

The following additional claims describe herein of the present invention:

I. Create Virtual Vehicle to Increase Sampling Rate and Estimation Accuracy

Referring to FIG. 4, when a vehicle with a mobile/Bluetooth device travels over multiple TPM sensor detection transceiver locations, the central server can link a specific mobile device's identification number to a group of TPM sensor(s). A virtual vehicle can then be created in the central server. On one hand, this will help filter out the mobile/Bluetooth devices not traveling in a vehicle to provide more accurate traffic information; on the other hand, it greatly increases the sampling rate of the TPM sensor detection transceivers since if any one of the identification numbers belonging to a virtual vehicle is detected at one location, the system is able to identify the vehicle.

II. Selected Roadside TPM Sensor Detection Transceivers to Provide Merchant Information in a Localized Area Referring to FIG. 5, encrypted TPM sensor detection transceivers affixed to selected roadside locations are in constant connection with the secured central server. When users accessing the live traffic flow map generated by the central server enter the designated detection area of a TPM sensor detection transceiver, the secured central server sends information to the user's cellular device or vehicular computer system regarding merchant and service provider offers in that immediate localized vicinity. The benefit is that local communities and its merchants have another source of advertising without interfering with motorists (i.e. no visual advertisements on the roadways).

III. TPM Sensor Like Device to Protect Assets

Encrypted TPM sensor detection transceivers record the TPM sensor identification codes when the vehicle enters the invention's radio frequency detection area. Referring to FIG. 6, a TPM sensor like device (#20) can be installed on or in a protected or concealed location within the vehicle. The commercial fleet will register the unique ID codes of TPM sensor like devices to the secured server. Since each device has a unique identification code, in conjunction with a database, commercial fleets (i.e. Car Rental Company) can use the encrypted TPM sensor detection transceiver and secured central server to locate and track specific vehicles or passengers.

IV. Tire Pressure Monitoring System Sensor Data for Classification of Vehicles

TPMS information can be utilized to classify vehicles since different types of vehicles have different inflation pressures (e.g. passenger cars vs. trucks) and different car manufacturers (e.g. Ford vs. GM) install different TPM sensors which have different communication protocols. Referring to FIG. 7, TPM sensor detection transceivers can send radio frequency transmissions to the TPM sensors of a vehicle which will cause the sensors to respond back with tire pressure data. A central server processor can then classify the vehicles based on its tire pressure. This is extremely useful in applications where there is heavy equipment on regular passenger roadways in determining construction or other heavy emergency vehicles in the detection area of the encrypted TPM sensor detection transceiver areas.

V. Tire Pressure Monitoring Sensor Detection for Traffic Sign Assistance

Drivers who are not familiar with a roadway could be unaware of special regulations and/or warnings in the vicinity. Possible traffic signs attempting to inform the driver could be missed or damaged/blocked by the environment. Referring to FIG. 8, a system of special road markings and encrypted TPM sensor detection transceivers can be utilized to send radio frequency transmissions which would cause a unique inflation pressure signal sequence detected by the TPMS sensors of a vehicle when passed on the road. An on-screen warning such as "wrong way", "sharp turn ahead" or "road closed" depending on the signal sequence could then be displayed to inform the driver of potential warnings. This method is to be utilized to support the function of traffic signs in order to enhance surface vehicular transport safety by preventing motorist of dangerous conditions.

VI. Road Condition Analysis

Municipal roadway management departments utilize manual, visual control to assess the condition of roads or via motorist complaints. As shown in FIG. 9, a specialized unit equipped to read TPM sensor activity of vehicles may be implemented. The unit may communicate data received by the TPMS from the encrypted TPM sensors to a secured central server while the vehicle is in motion. The vehicle could then be tracked while simultaneously monitoring for sharp changes in the tire pressure data broadcasted by the TPMS sensors to the specialized unit which will then be encrypted and sent to the secured central server which could indicate approximate degraded road surface conditions (i.e. pot hole detection and repair).

VII. Road Condition Due to Weather Warning

The sensors of a vehicle's TPMS can detect temperature in the tires and, to a large degree of accuracy, the temperature of the road surface. As shown in FIG. 10, selected roadside encrypted TPM sensor detection transceivers can be utilized to access this data via radio frequency transmissions. Vehicles are also equipped with rain sensors. By encrypting and combining the temperature data from the TPM sensors and the precipitation data from the rain sensors of a vehicle, a secured central server processor can determine the condition of the road and inform the driver of hazards (i.e. black ice).

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A system to estimate traffic flow data used in conjunction with a vehicle having at least four (4) wheels on which the vehicle travels, a tire pressure monitoring system (TPMS) which includes a Tire Pressure Monitor (TPM) electric control unit (ECU) inside the vehicle, a separate tire pressure monitor (TPM) sensor respectively installed in at least four wheels of the vehicle, a visual tire pressure information member positioned to provide TPM information from the TMP ECU received from each TPM sensor to a driver while the vehicle is being driven, each TPM sensor having a unique identification code to periodically broadcast data of the current pressure and temperature in each respective tire and further broadcast a radio frequency (RF) signal from each respective TPM sensor in each respective one of the wheels of the vehicle to the TPM ECO ("TPM installed vehicle"), the system to estimate traffic flow data comprising:

a. positioning a first encrypted TPM detection transceiver having a first given detection range at a first location where said TPM installed vehicle passes within the second given detection range, the first encrypted transceiver pre-programmed to capture and decode RF signals broadcast by said TPM installed vehicle's TMP sensors and obtaining each unique identification code associated with each specific TPM sensor and time stamping each unique identification code (collectively first TPM sensor data) and transmitting the first TMP sensor data to said secure central server in a first encrypted data message;

b. positioning a second encrypted TPM detection transceiver having a second given detection range at a second location where said TPM installed vehicle passes within the second given detection range, the second encrypted transceiver pre-programmed to capture and decode RF signals broadcast by said TPM installed vehicle's TMP sensors and obtaining each unique identification code associated with each specific TPM sensor and time stamping each unique identification code (collectively second TPM sensor data) and transmitting the second TMP sensor data to said secure central server in a second encrypted data message; and c. when the same identification is transmitted in the first encrypted data message and the second encrypted data message, the central server converts the encrypted data messages to an estimate of travel time, delay and origination-destination information of said TMP installed vehicle.

2. The system to monitor traffic flow data in accordance with claim 1 wherein said first location is a roadway and said second location is a roadway.

3. A system to estimate traffic flow data used in conjunction with a vehicle having at least four (4) wheels on which the vehicle travels, a tire pressure monitoring system (TPMS) which includes a Tire Pressure Monitor (TPM) electric control unit (ECU) inside the vehicle, a separate tire pressure monitor (TPM) sensor respectively installed in at least four wheels of the vehicle, a visual tire pressure information member positioned to provide TPM information from the TMP ECU received from each TPM sensor to a driver while the vehicle is being driven, each TPM sensor having a unique identification code to periodically broadcast data of the current pressure and temperature in each respective tire and further broadcast a radio frequency (RF) signal from each respective TPM sensor in each respective one of the wheels of the vehicle to the TPM ECO ("TPM installed vehicle"), the system to estimate traffic flow data comprising:

a. positioning a multiplicity of encrypted TPM detection transceivers each having a given detection range at a multiplicity of locations where said TPM installed vehicle passes within said given detection range, each respective encrypted transceiver pre-programmed to capture and decode RF signals broadcast by said TPM installed vehicle's TMP sensors and obtaining each unique identification code associated with each specific TPM sensor and time stamping each unique identification code (respective TPM sensor data) and transmitting said respective TMP sensor data to said secure central server in a respective encrypted data message for each respective one of the multiplicity of TMP transceivers; and b. when the same identification is transmitted in each of said respective encrypted data message, the central server integrates all of the respective encrypted data messages to an estimate of travel time, delay and origination-destination of said TMP installed vehicle.

4. The system to monitor traffic flow data in accordance with claim 1 wherein each said location is a roadway.

* * * * *